United States Patent
Chang et al.

(10) Patent No.: US 8,830,861 B2
(45) Date of Patent: Sep. 9, 2014

(54) WIRELESS COMMUNICATION METHOD AND APPARATUS FOR TRANSMITTING AND RECEIVING FRAME THROUGH RELAY

(75) Inventors: Kap Seok Chang, Daejeon (KR); Hyoung Jin Kwon, Daejeon (KR); Sung Geun Jin, Daejeon (KR); Yong Sun Kim, Daejeon (KR); Seung Eun Hong, Daejeon (KR); Woo Yong Lee, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 70 days.

(21) Appl. No.: 13/579,469

(22) PCT Filed: Feb. 16, 2011

(86) PCT No.: PCT/KR2011/001011
§ 371 (c)(1),
(2), (4) Date: Aug. 16, 2012

(87) PCT Pub. No.: WO2011/102634
PCT Pub. Date: Aug. 25, 2011

(65) Prior Publication Data
US 2012/0314609 A1 Dec. 13, 2012

(30) Foreign Application Priority Data

Feb. 16, 2010 (KR) .......... 10-2010-0013895
Feb. 23, 2010 (KR) .......... 10-2010-0016181
Feb. 24, 2010 (KR) .......... 10-2010-0016508
Feb. 16, 2011 (KR) .......... 10-2011-0013510

(51) Int. Cl.
*H04W 48/16* (2009.01)
*H04W 24/00* (2009.01)
*H04W 72/08* (2009.01)
*H04W 40/12* (2009.01)
*H04W 40/24* (2009.01)
*H04B 7/14* (2006.01)

(52) U.S. Cl.
USPC ........... 370/252; 370/336; 370/315; 370/312; 370/254; 370/324; 370/329; 370/350; 455/7

(58) Field of Classification Search
USPC ......... 370/252, 254, 280, 312, 315, 324, 328, 370/329, 330, 336, 350; 455/7, 9, 11.1
See application file for complete search history.

(56) References Cited

U.S. PATENT DOCUMENTS 7,113,495 B2 * 9/2006 Furukawa ............... 370/329
7,123,908 B2 * 10/2006 Chandler ............... 455/428
(Continued)

FOREIGN PATENT DOCUMENTS

EP 1 698 186 B1 10/2008
EP 2485411 A2 8/2012
(Continued)

OTHER PUBLICATIONS

Zhou Lan et al., "Achieving Gbps Throughput for Millimeter-Wave WPAN with an Anti-Blocking Scheme Using Deflection Routing", 2009 IEEE 70th, Vehicular Technology Conference Fall, Sep. 20-23, 2009, pp. 1-6.
(Continued)

Primary Examiner — Ahmed Elallam
(74) Attorney, Agent, or Firm — Rabin & Berdo, P.C.

(57) ABSTRACT

The present invention provides a wireless communication method used for transmitting and receiving a relay in a wireless local area network system. The wireless local area network system according to an embodiment of the present invention relates to a wireless communication method of setting a relay link through a relay and setting a transmission time point at which a data frame is transmitted in a source device by recognizing a propagation delay between devices, and the like when an operation mode of the set relay corresponds to a cooperating mode.

20 Claims, 14 Drawing Sheets

(56) References Cited

U.S. PATENT DOCUMENTS

| | | | |
|---|---|---|---|
| 7,742,399 B2* | 6/2010 | Pun | 370/218 |
| 7,873,338 B2* | 1/2011 | Visotsky et al. | 455/226.2 |
| 8,570,945 B2* | 10/2013 | Seok | 370/328 |
| 2004/0109428 A1* | 6/2004 | Krishnamurthy | 370/338 |
| 2004/0132452 A1* | 7/2004 | Lee | 455/445 |
| 2007/0041345 A1* | 2/2007 | Yarvis et al. | 370/331 |
| 2007/0202803 A1 | 8/2007 | Miyoshi | |
| 2009/0258639 A1 | 10/2009 | Nyström et al. | |
| 2011/0256828 A1* | 10/2011 | Hsu et al. | 455/13.1 |
| 2012/0230247 A1* | 9/2012 | Kwon et al. | 370/315 |
| 2012/0307673 A1* | 12/2012 | Chang et al. | 370/252 |

FOREIGN PATENT DOCUMENTS

| | | |
|---|---|---|
| GB | 2455794 A | 6/2009 |
| JP | 2009-071482 A | 4/2009 |
| JP | 2009-267851 A | 11/2009 |
| KR | 20050035025 A | 4/2005 |
| KR | 20100033629 A | 3/2010 |
| WO | WO-2007021602 A1 | 2/2007 |

OTHER PUBLICATIONS

Zhou Lan et al., "Relay with deflection routing for effective throughput improvement in Gbps millimeter-wave WPAN systems", IEEE Journal on Selected Areas in Communications, Oct. 2009, pp. 1453-1465, vol. 27, No. 8.

Singh, Sumit. "Blockage and Directivity in 60 GHz Wireless Personal Area Networks: From Cross-Layer Model to Multihop MAC Design"; IEEE Journal on Selected Areas in Communications, vol. 27, No. 8, Oct. 2009.

"High Rate 60 GHz PHY, MAC and HDMI PAL" ECMA-387; Standard, 1st Ed., Dec. 2008, Geneva.

* cited by examiner

WIRELESS COMMUNICATION METHOD AND APPARATUS FOR TRANSMITTING AND RECEIVING FRAME THROUGH RELAY

TECHNICAL FIELD

The present invention relates to a wireless communication method and apparatus of using a relay for a transmission and reception by setting a relay link in a wireless local area network system.

BACKGROUND ART

In a wireless local area network environment, a data frame may be transmitted via a Personal Basic service set central point/Access point (PCP/AP) (hereinafter, referred to as an AP for convenience of description) and may be directly transmitted based on a peer to peer scheme. However, in general, a transmission using an uplink and downlink to the AP may be in contention with another station (STA) in a network to acquire a channel and thus, an amount of processing may be reduced. In order to compensate for the reduction, in 802.11e, an STA may directly transmit a frame to another STA through a direct link setup (DLS) mode, not using the AP, to enhance efficiency of using a channel by at least a factor of two. However, even in the DLS mode multiple paths, attenuation, interference, and the like may deteriorate a channel status and reduce an amount of processing a wireless network and thus, may not satisfy a requested Quality of Service (QoS) for streaming multimedia.

A circumstance of a case of using a QoS such as the streaming multimedia may be remarkable in a millimeter wave such as a 60 GHz band. Even though millimeter wave communication may easily transmit several Gbps of data using about a 1.8 GHz bandwidth without a high modulation, the millimeter wave communication may have demerits of a strong straightness due to a characteristic of a high frequency and a large amount of power loss and thus, a scheme of obtaining a high antenna gain may be recommended to ease the demerits by allowing for power to be directed in a particular direction rather than all directions through use of a directional antenna. However, when a line of sight is not secured, a signal may be reflected and transferred thereby increasing a length for transferring the signal to increase an attenuation loss and adding a further loss due to the reflection. When the line of sight is blocked by a person, a penetration loss may be at least 20 dB, whereas a door or wall indoors may further increase the loss to interrupt an arrival of the signal.

Accordingly, a scheme may be used to extend a length for communication or to constantly communicate even when a direct link is blocked by using both of a direct link between a source device and a destination device and a relay link that uses a relay in addition to the DLS mode.

DISCLOSURE OF INVENTION

Technical Goals

An aspect of the present invention provides a wireless communication method to of using a relay for a transmission and reception in a wireless local area network system.

Another aspect of the present invention provides a method of setting a relay link in a wireless local area network system.

Still another aspect of the present invention provides a method of setting a transmission time point, at which a data frame is transmitted at a source device, when an operation mode of a relay corresponds to a cooperating mode after setting a relay link in a wireless local area network system.

Technical Solutions

According to an aspect of the present invention, there is provided a method for wideband short-range wireless communication, the method including discovering, by a source device, a list of relay devices in a basic service set, checking a status of a channel between the source device and the relay devices and a status of a channel between a destination device and the relay devices, and selecting a relay device to operate as a relay between the source device and the destination device, and transmitting a link setup request message to the selected relay device, and setting a relay link through the selected relay device.

According to an aspect of the present invention, there is provided a method for a wideband short-range wireless communication, the method including acquiring information about a relay capability of a destination device, discovering relay devices capable of providing a service through a personal basic service set central point (PCP) or an access point (AP), receiving information, about assigning a service period resource of each of the relay devices, from the PCP or the AP, performing a beamforming process with each of the relay devices, acquiring, from each of the relay devices, a status of a channel between the source device and each of the relay devices, performing a beamforming process with the destination device, acquiring, from a destination device, a status of a channel between the source device and the destination device and a status of a channel between the relay devices and the destination devices, selecting a relay device to be used using the status of a channel between the source device and the relay devices, the status of a channel between the source device and the destination device, the status of a channel between the relay devices and the destination devices, and information about a relay capability of each of the relay devices, requesting to and receiving a response from the selected relay device and the destination device for whether a relay link is permitted through the selected relay device and transmitting, to the PCP or the AP, a relay link setup (RLS) announcement message announcing that the relay link is set when the relay link is successfully set.

According to an aspect of the present invention, there is provided a method for wideband short-range wireless communication, the method including receiving information about assigning a service period resource from a PCP or an AP, performing a beamforming process with each of a source device and a destination device, transmitting to the source device a channel measurement report message, including information about a status of a channel to the source device, in response to a reception of a channel measurement request message from the source device, transmitting a RLS request message to the destination device in response to a reception of the RLS request message from the source device, and including information, about whether a relay link is permitted, in a RLS response message, and transmitting the RLS response message to the source device, in response to a reception of the RLS response message from the destination device.

According to an aspect of the present invention, there is provided a method for wideband short-range wireless communication, the method including receiving an unsolicited relay search response message, including a list of relay devices and information about a relay capability of a source device, from a PCP or an AP, receiving information, about assigning a service period resource of each of the relay devices, from the PCP or the AP, performing a beamforming process with each of the relay devices, performing a beamforming process with the source device, transmitting a channel measurement report message, including information about a status of a channel to the relay devices, to the source device in response to a reception of a channel measurement request message from the source device, and transmitting a RLS response message, including information about whether the destination device is participating in a relay link, to a relay device selected as a relay link by the source device in response to a reception of the RLS response message from the selected relay device.

The present invention relates to a wireless communication method of setting a relay link through a relay and setting a transmission time point, at which a data frame is transmitted at a source device, by recognizing a propagation delay between devices and to the like, when an operation mode of the set relay corresponds to a cooperating mode. According to the present invention, by using both of a direct link between a source device and a destination device and a relay link that uses a relay device, a length for communication may be extended, communication may be constantly performed even when a direct link is blocked, and a processing ratio may be enhanced by supporting a cooperating mode through a relay according to a channel status.

BEST MODE FOR CARRYING OUT THE INVENTION

Figure 1:
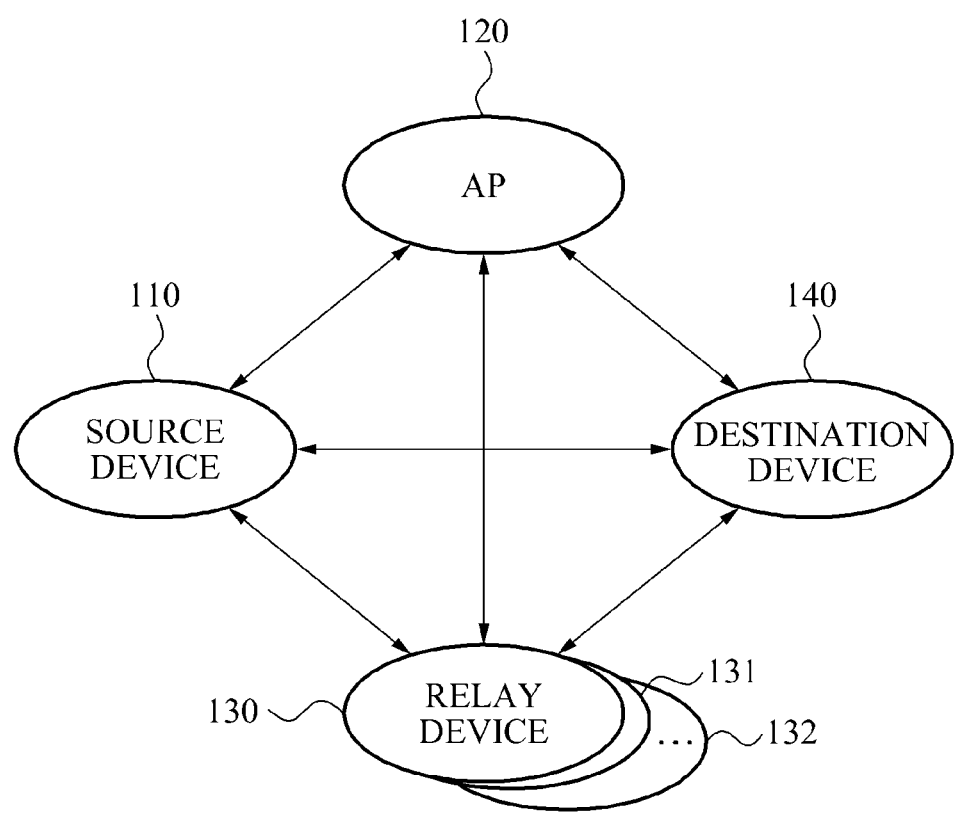
FIG. 1 is a diagram illustrating a schematic configuration of a wireless local area network system where a relay is used for a transmission and reception according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Embodiments of the present invention relates to a wireless communication method, in a wireless local area network system, of setting a relay link to use a relay for a transmission and reception and setting a transmission time point, at which a data frame is transmitted at a source device, when an operation mode of the set relay corresponds to a cooperating mode.

FIG. 1 is a diagram illustrating a schematic configuration of a wireless local area network system where a relay is used for a transmission and reception according to an embodiment of the present invention.

Referring to FIG. 1, the wireless local area network system may include a Personal Basic service set central point/Access point (PCP/AP) 120 (hereinafter, referred to as an AP for convenience of description) and at least one device, that is, a source device 110, relay devices 130, 131, and 132, and a destination device 140. Here, the PCP/AP 120 may correspond to one of a PCP and an AP, and may correspond to a device where the PCP and the AP are combined.

The source device 110, the relay devices 130, 131, and 132, or the destination device 140 may transmit an association request frame to the AP 120 and receive an association response frame from the AP 120 to join a wireless local area network.

Thereafter, the source device 110 may select a relay device 130 through setting a relay link between the relay devices 130, 131, and 132 and the destination device 140, and may transmit a data frame using the selected relay device 130.

The source device may acquire information about a relay capability of a destination device before performing a relay link setup (RLS) operation with the destination device. The information about a relay capability may be received from the AP, and may be received from the destination device. In this instance, the information about a relay capability may include whether the relay is used, whether an operation to the relay is performed, a permission of using the relay, whether a power is on, a motion, a degree of preference of the relay, information about a duplex at the relay, a type of operation of the relay, and the like.

When the source device and the destination device are capable of using a relay device, an operation of setting the relay link may be performed. The operation of setting the relay link in the wireless local area network system will be described with reference to FIG. 2 through FIG. 4.

Figure 2:
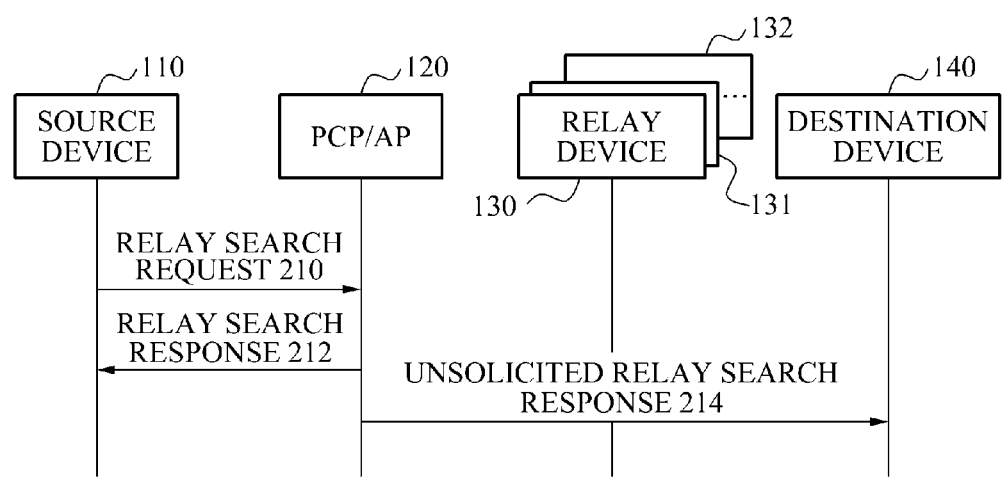
FIG. 2 is a diagram illustrating an operation of searching for relay devices capable of providing a service in a wireless local area network system according to an embodiment of the present invention.

FIG. 2 is a diagram illustrating an operation of searching relay devices 130, 131, and 132 capable of providing a service in a wireless local area network system according to an embodiment of the present invention.

Referring to FIG. 2, first, the source device 110 may discover a list of relay devices in a basic service set through relay discovery procedures. Here, the basic to service set may correspond to a network unit configured by a single PCP/AP and at least one station. In this instance, the station may correspond to a source device, a relay device, and a destination device.

More particularly, in operation 210, the source device 110 may transmit a relay search request message requesting the PCP/AP 120 to search a relay.

In operation 212, the PCP/AP 120 may search a list of the relay devices 130, 131, and 132, that are capable of providing a service and included in the basic service set, and may transmit a relay search response message including the list of the relay devices to the source device 110.

In operation 214, the PCP/AP 120 may transmit an unsolicited relay search response message, including the list of the relay devices 130, 131, and 132 and information about a relay capability of the source device 110, to the destination device 140.

The wireless local area network system may search the relay devices, and then select the relay device 130.

Figure 3:
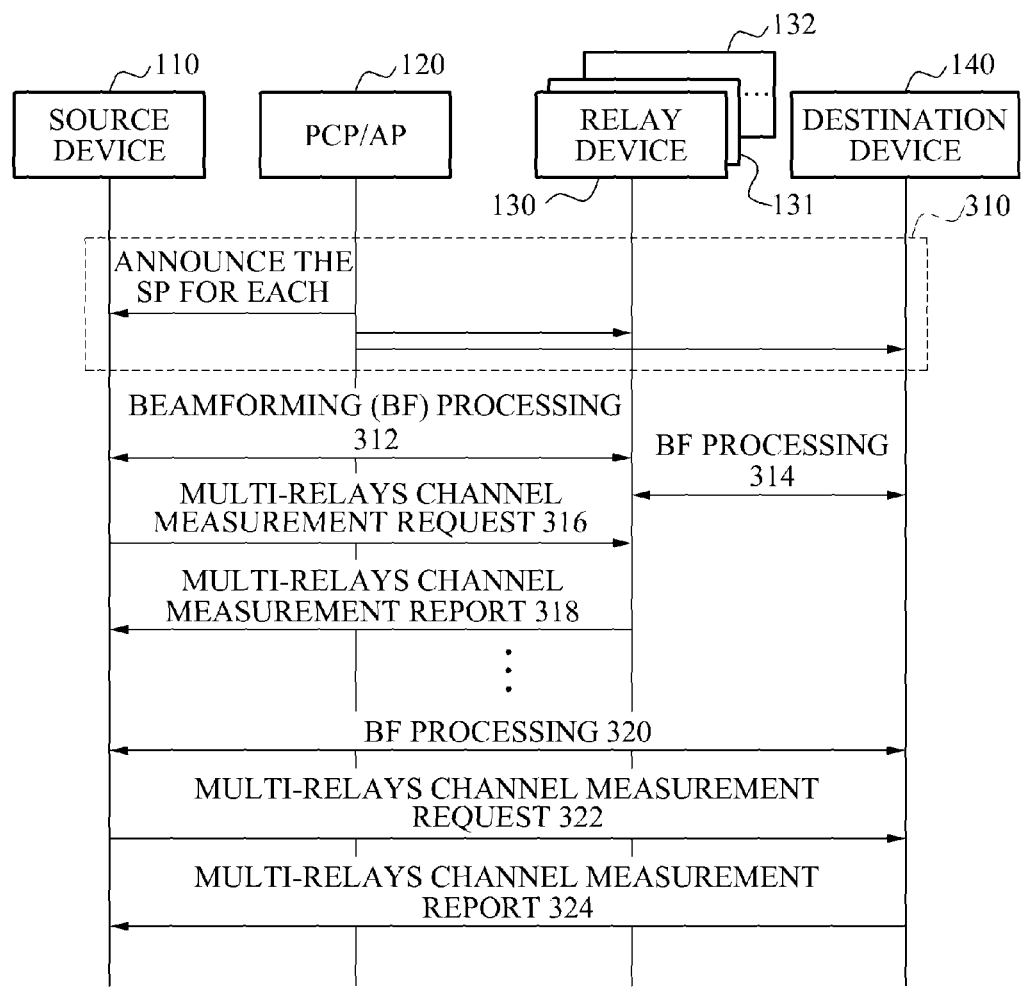
FIG. 3 is a diagram illustrating an operation of selecting a relay device to be used as a relay link in a wireless local area network system according to an embodiment of the present invention.

FIG. 3 is a diagram illustrating an operation of selecting a relay device to be used as a relay link in a wireless local area network system according to an embodiment of the present invention.

Referring to FIG. 3, in operation 310, the PCP/AP 120 may transmit information, about assigning a service period resource of each of the relay devices 130, 131, and 132, to the source device 110 and the destination device 140.

In operation 312, the source device 110, receiving the information about assigning a service period resource, may perform a beamforming process with each of the relay devices 130, 131, and 132. As is well known, the beamforming may correspond to a mechanism performed by a couple of devices for accomplishing a millimeter-wave link budget used for a subsequent communication. Thus, a duration may be assigned to the service period, assigned from the PCP/AP 120, to complete a beamforming process with each of the relay devices and the source device 110. A duration may be assigned to complete a beamforming with each of the relay devices and the destination device 140. Likewise, a duration may be assigned to complete a beamforming between the source device 110 and the destination device 140.

In operation 314, the destination device 140 may perform a beamforming to process with each of the relay devices 130, 131, and 132.

In operation 316, the source device 110 may transmit a channel measurement request message to each of the relay devices 130, 131, and 132. In operation 318, the source device 110 may receive, from each of the relay devices 130, 131, and 132, a channel measurement response message including information about measuring a channel indicating a status of a channel to the source 110, and may check the status of a channel between the source device 110 and each of the relay devices 130, 131, and 132. Here, the status of a channel may include information about a direction, a channel quality, and the like of a corresponding link, and may be referred to as a channel status. The source device 110 may repeatedly perform an operation of receiving a channel response message and checking a channel status with respect to each of the relay devices 130, 131, and 132 in the basic service set.

In operation 320, the source device 110 may perform a beamforming process between the source device 110 and the destination device 140.

In operation 322, the source device 110 may transmit a channel measurement request message to the destination device 140. In operation 324, the source 110 may receive, from the destination device 140, a channel measurement response message including a status of a channel between the source device 110 and the destination device 140 and a status of a channel between the relay devices 130, 131, and 132 and the destination device 140.

Thereafter, the source device 110 may select a relay device 130 to be used based on the status of a channel between the source device 110 and the relay devices 130, 131, and 132, a status of a channel between the source device 110 and the destination device 140, a status of a channel between the relay devices 130, 131, and 132 and the destination devices 140, and information about a relay capability of each of the relay devices 130, 131, and 132.

Figure 4:
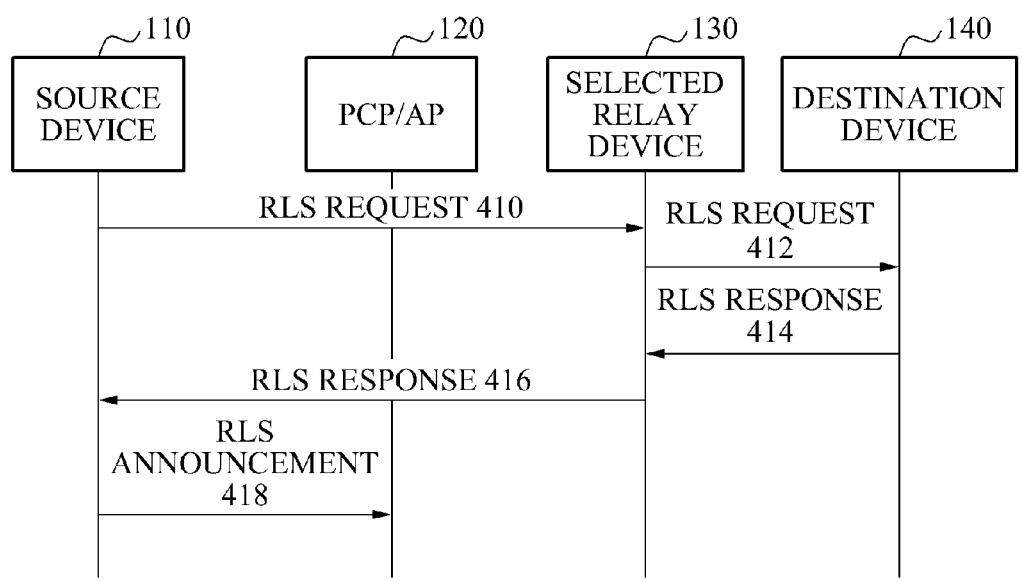
FIG. 4 is a diagram illustrating an operation of setting a relay link through a selected relay device in a wireless local area network system according to an embodiment of the present invention.

FIG. 4 is a diagram illustrating an operation of setting a relay link through a selected relay device in a wireless local area network system according to an embodiment of the present invention.

Referring to FIG. 4, in operation 410, the source device 110 may transmit an RLS request message, requesting to set a relay link, to the selected relay device 130. In this instance, the RLS request message may include information about a relay to transmission parameter and information about a relay capability of each of the source device 110, the destination device 140, and the selected relay device 130. The information about a relay transmission parameter may include information about a type of operation of the relay, information about a duplex transmission mode of the relay, and information used for transmitting and receiving other data frames. In operation 412, in response to a reception of an RLS request message, the selected relay device 130 may transmit the RLS request message to the destination device 140.

In operation 414, in response to a reception of the RLS request message from the selected relay device 130, the destination device 140 may transmit, to the selected relay device 130, an RLS response message including information about whether the destination device 140 is participating in a relay link.

In response to a reception of the RLS response message in operation 414, the selected relay device 130 may include information, about whether the selected relay device 130 is participating in the relay link, in the RLS response message to be transmitted to the source device 110.

In operation 416, the source device 110 may receive an RLS response message from the selected relay device 130.

When the source device 110 checks the RLS response message and finds that both of the selected relay device 130 and the destination device 140 participate in the relay link, the source device 110 may transmit, to the PCP/AP 120, an RLS announcement message announcing that the relay link using the selected relay device 130 is set in operation 418.

Figure 5:
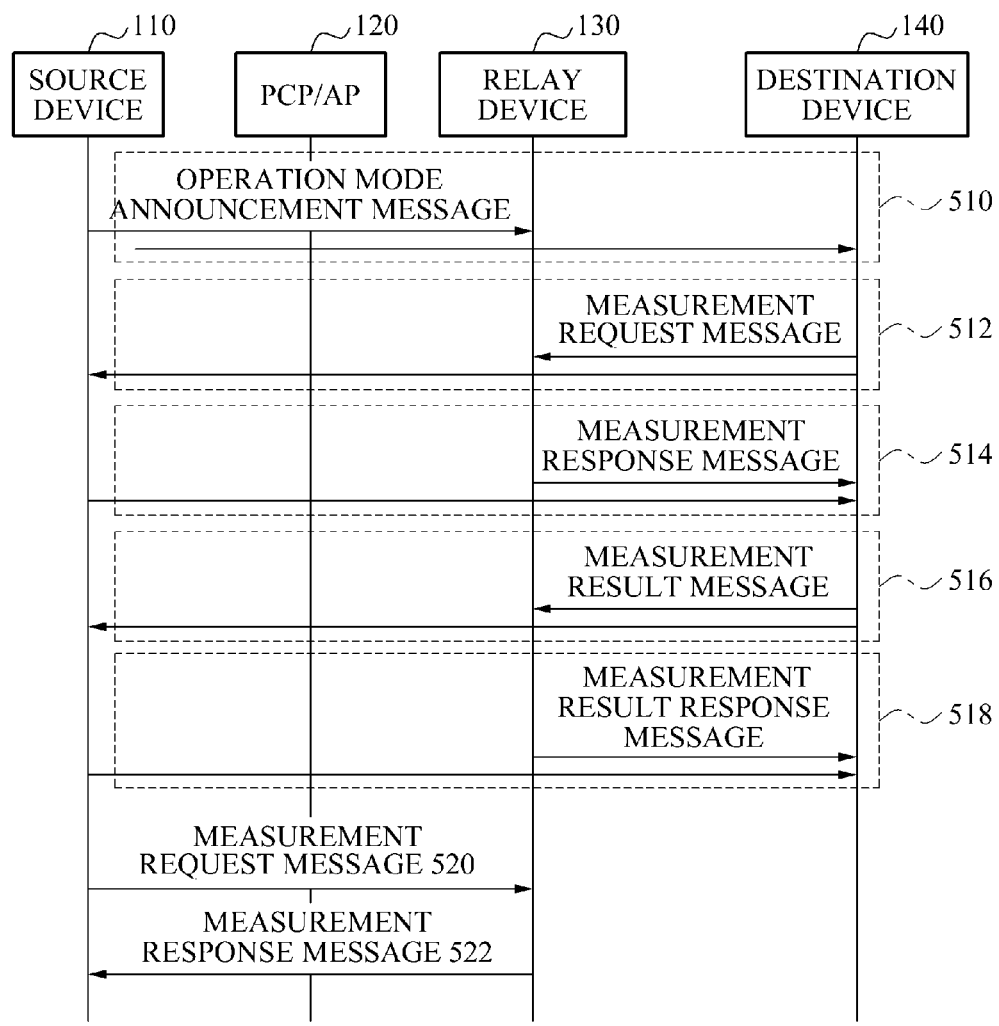
FIG. 5 is a diagram illustrating an operation of setting a transmission time point when an operation mode of a relay corresponds to a cooperating mode in a wireless local area network system according to an embodiment of the present invention.

FIG. 5 is a diagram illustrating an operation of setting a transmission time point when an operation mode of a relay corresponds to a cooperating mode in a wireless local area network system according to an embodiment of the present invention.

Referring to FIG. 5, the source device 110 may determine, as an operation mode of a relay, a more efficient operation mode between a switching mode and the cooperating mode or a mode selected by a user. Here, the switching mode may correspond to a mode that determines, through a switching, whether data is transmitted via a relay. The cooperating mode may correspond to a mode that enables data transmitted via a relay and data transmitted without going through a relay to to simultaneously arrive at the destination device.

When the operation mode of the relay is determined to be the cooperating mode, the source device 110 may transmit an operation mode announcement message, to the selected relay device 130 and the destination device 140 in operation 510, announcing that the operation mode of the relay is determined to be the cooperating mode.

In operation 512, in response to a reception of an operation mode announcement message, the destination device 140 may transmit a measurement request message to the selected relay device 130 and the source device 110. In this instance, the measurement request message may correspond to a transmission time point adjustment (TPA) request frame where both of a timing offset and a sampling offset are set to "0."

In operation 514, in response to a reception of the measurement request message, each of the selected relay device 130 and the source device 110 may respectively transmit a measurement response message at a predetermined time. In this instance, at a predetermined time, when a first measurement response message is transmitted, may be different between the selected relay device 130 and the source device 110, and may be included in the measurement request message. The measurement request message may correspond to a TPA response frame.

The destination device 140 may estimate a sampling offset and a timing offset between the source device 110 and the destination device 140 using the measurement response message received from the source device 110. The destination device 140 may estimate a sampling offset and a timing offset between the selected relay device 130 and the destination device 140 using the measurement response message received from the selected relay device 130. Here, the timing offset may correspond to a propagation delay time due to a delayed propagation, and the sampling offset may correspond to an error occurring due to a clock error, and the like in a device.

In operation 516, the destination device 140 may transmit a measurement result message, including the timing offset and the sampling offset, to the selected relay device 130 and the source device 110.

In operation 516, the destination device 140 may transmit, to the relay device 130, information about a relative difference of an offset estimated from the relay device and the source device. In this instance, the measurement result message may correspond to a TPA request frame including an estimated timing offset and an estimated sampling offset or including the relative difference of an offset estimated from the relay device and the source device.

A procedure of adjusting a transmission time point may be repeatedly performed for a predetermined number of times. In this instance, the destination device 140 may transmit, to the source device, a report frame indicating whether the procedure of adjusting a transmission time point is successful. That is, the destination device 140 may transmit the TPA request frame to the relay device, and may receive, from the relay device, a TPA response frame corresponding to a response frame with respect to the TPA request frame. In this instance, a timing offset of the TPA request frame may be set to $dT_{DS}-dT_{DR}$. In response to a reception of the TPA response frame, the destination device 140 may estimate a time deviation between a predetermined delay time and an actual arrival time of the TPA response frame. The predetermined delay time may correspond to a sum of a short beamforming intermessage space (SBIFS) and a length of the TPA request frame. In a wideband local area wireless communication system, two frames may be separated by the SBIFS, a duration of the SBIFS may be determined based on a characteristic of a physical layer. When the time deviation corresponds to "$2 \times dT_{DR}+(dT_{DS}-dT_{DR})$," the destination device 140 may determine that the TPA procedure is successful. In this instance, $dT_{DR}$ denotes a propagation delay occurring from the destination device 140 to the relay device, and $dT_{DS}$ denotes a propagation delay occurring from the destination device 140 to the source device.

In operation 518, in response to a reception of the measurement result message, each of the selected relay device 130 and the source device 110 may transmit, to the destination device 140, a measurement result response message announcing that the measurement result message is received. The measurement result response message may correspond to the TPA response frame.

In operation 520, the source device 110 may transmit a measurement request message to the selected relay message 130.

In operation 522, in response to a reception of the measurement request message, the selected relay message 130 may transmit a measurement response message to the source device 110 at a predetermined time.

In response to a reception of the measurement response message from the selected relay message 130, the source device 110 may estimate a sampling offset and a timing offset between the source device 110 and the selected relay message 130.

The source device 110 may use timing offsets and sampling offsets between each device to adjust a transmission time point of a frame to enable a frame #1, transmitted from the source device 110 to the destination device 140, and a frame #2, transmitted from the relay device 130 to the destination device 140, to simultaneously arrive at the destination device 140. Since an operation mode of a relay corresponds to a cooperating mode, the frame #1 and the frame #2 correspond to a frame including the same data.

Figure 6:
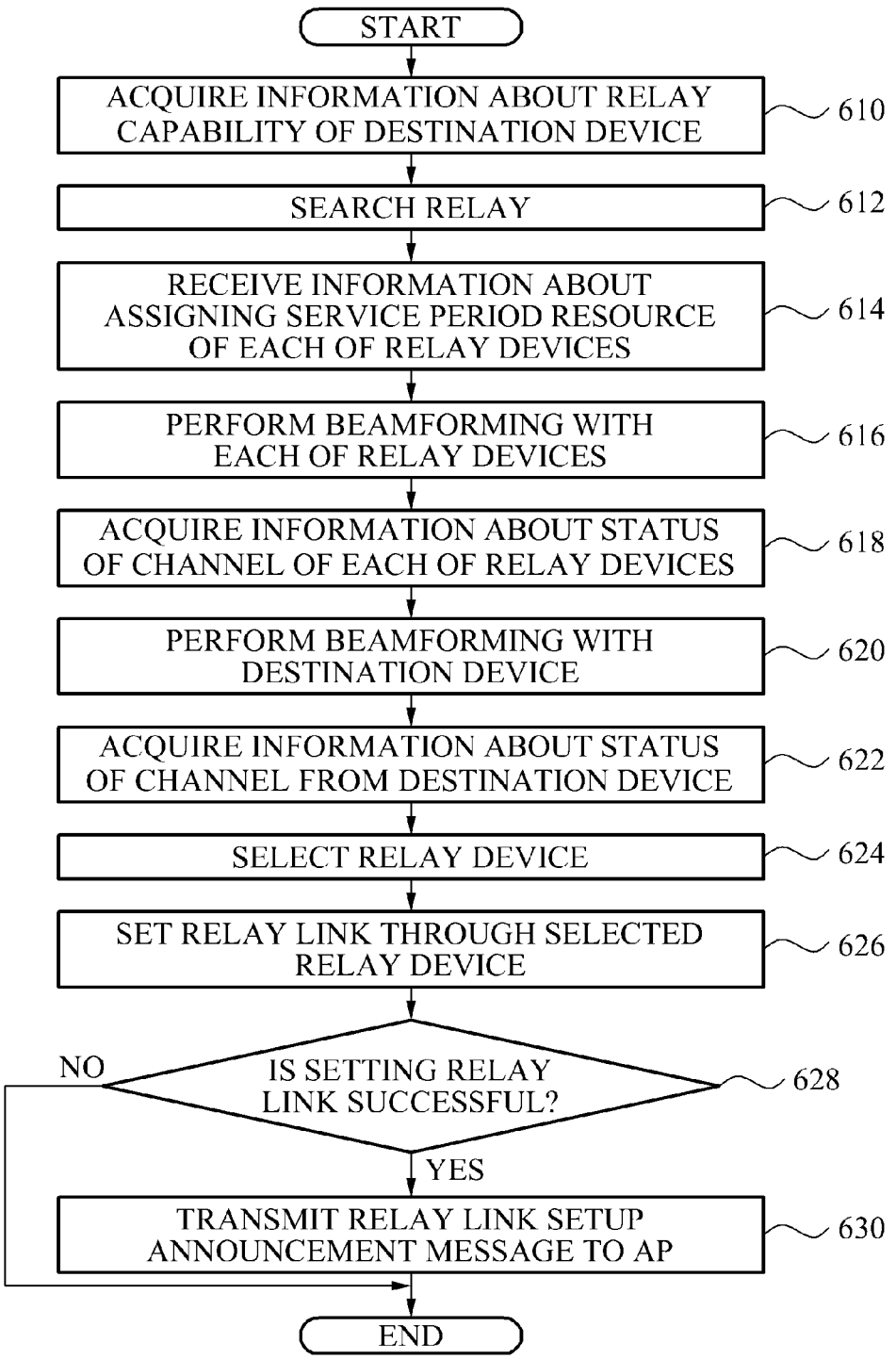
FIG. 6 is a flowchart illustrating an operation of setting a relay link in a source device of a wireless local area network system according to an embodiment of the present invention.

FIG. 6 is a flowchart illustrating an operation of setting a relay link in a source device of a wireless local area network system according to an embodiment of the present invention.

Referring to FIG. 6, in operation 610, the source device 110 may acquire information about a relay capability of the destination device 140. The information about a relay capability of the destination device 140 may be received from the PCP/AP 120 and may be received from the destination device 140. In this instance, the information about a relay capability may include whether the relay is used, whether an operation to the relay is performed, a permission of using the relay, whether a power is on, a motion, a degree of preference of the relay, information about a duplex at the relay, a type of operation of the relay, and the like.

In operation 612, the source device 110 may search, through the PCP/AP 120, the relay devices 130, 131, and 132 capable of providing a service. More specifically, the source device 110 may transmit, to the PCP/AP 120, a relay search request message requesting to search a relay, and may receive, from the PCP/AP 120, a relay search response message including a list of the relay devices capable of providing a service included in a basic service set, thereby searching the relay devices 130, 131, and 132.

In operation 614, the source device 110 may receive information about assigning a service period resource of each of the relay devices 130, 131, and 132 from the PCP/AP 120.

In operation 616, the source device 110 may perform a beamforming process with each of the relay devices 130, 131, and 132.

In operation 618, the source device 110 may acquire a status of a channel, to the source device 110, from each of the relay devices 130, 131, and 132. More specifically, the source device 110 may transmit a channel measurement request message to each of the relay devices 130, 131, and 132, and receive a channel measurement response message, including a status of a channel to the source device 110, from each of the relay devices 130, 131, and 132, thereby checking the status of a channel.

In operation 620, the source device 110 may perform a beamforming process with the destination device 140.

In operation 622, the source device 110 may acquire, from the destination device 140, a status of a channel between the source device 110 and the destination device 140 and a status of a channel between the relay devices and the destination devices 140. More specifically, the source device 110 may transmit the channel measurement request message to the destination device 140, and may receive the channel measurement response message including the status of a channel between the source device 110 and the destination device 140 and the status of a channel between the relay devices and the destination device 140, thereby checking the status of a channel.

In operation 624, the source device 110 may select a relay device 130, to be used, using the status of a channel between the source device 110 and the relay devices 130, 131, and 132, the status of a channel between the source device 110 and the destination device 140, the status of a channel between the relay devices 130, 131, and 132 and the destination device 140, and information about a relay capability of each of the relay devices 130, 131, and 132. In this instance, a device to be used as a relay may be selected implementation-dependently.

In operation 626, the source device 110 may request and receive a response from the selected relay device 130 and the destination device 140 for whether a relay link is permitted through the selected relay device 130.

In operation 628, the source device 110 may verify whether both of the selected relay device 130 and the destination device 140 participate in the relay link to successfully set the relay link as a result of a response to the selected relay device 130 and the destination device 140.

When the relay link is successfully set as a result of the verification in operation 628, the source device 110 may transmit an RLS announcement message, announcing to that the relay link is set, to the PCP/AP 120 in operation 630.

Figure 7:
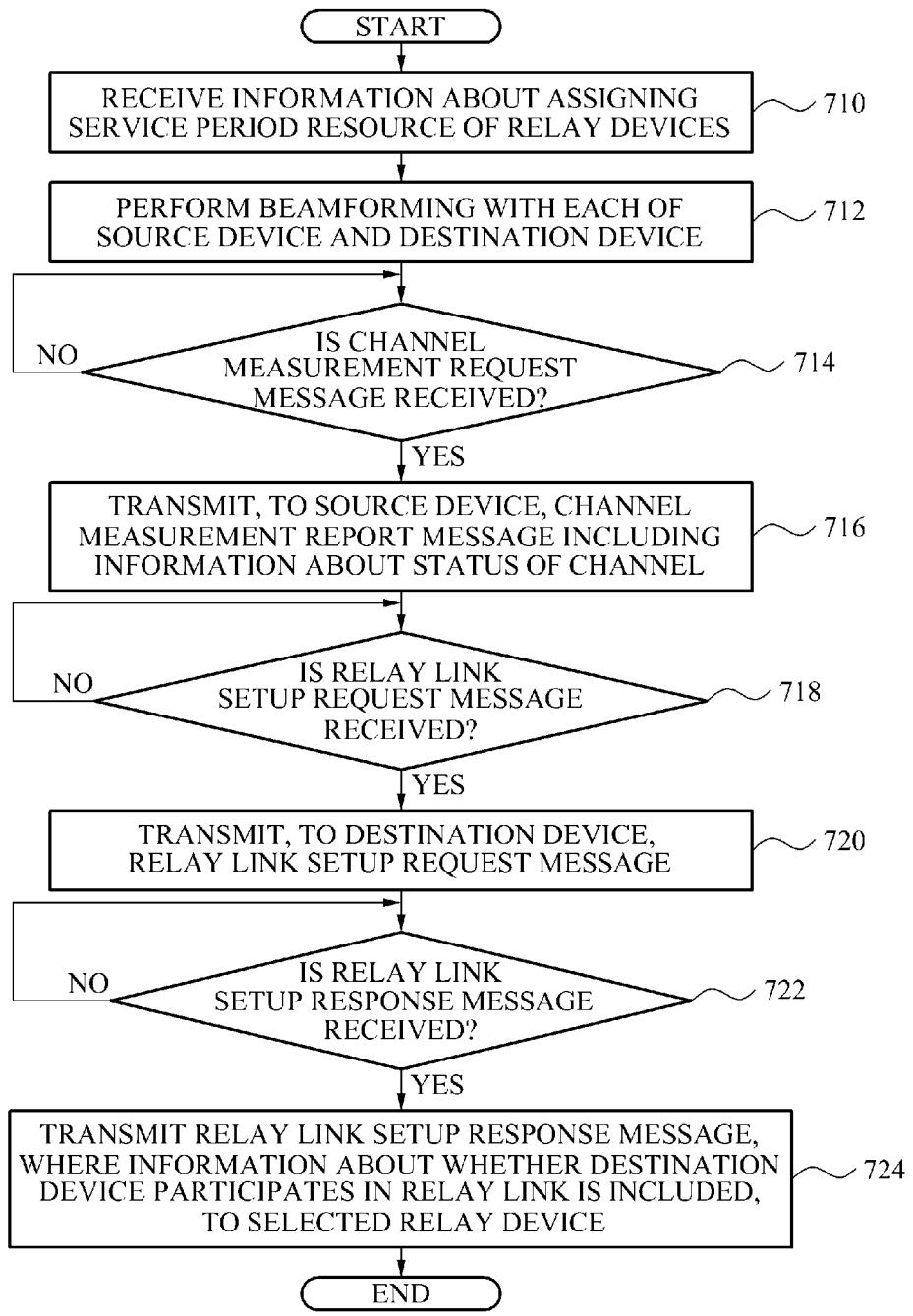
FIG. 7 is a flowchart illustrating an operation of setting a relay link in a relay device of a wireless local area network system according to an embodiment of the present invention.

FIG. 7 is a flowchart illustrating an operation of setting a relay link in a relay device of a wireless local area network system according to an embodiment of the present invention.

Referring to FIG. 7, in operation 710, the relay device 130 may receive information about assigning a service period resource from the PCP/AP 120.

In operation 712, the relay device 130 may perform a beamforming process with each of the source device 110 and the destination device 140.

In response to a reception of a channel measurement request message from the source device 110, in operation 714, the relay device 130 may transmit, to the source device 110, a channel measurement report message including information about a status of a channel in operation 716.

In response to a reception of an RLS request message from the source device 110, in operation 718, the relay device 130 may transmit the RLS request message to the destination device 140 in operation 720.

In response to a reception of an RLS response message from the destination device 140 in operation 722, the relay device 130 may include information, about whether the relay device 130 participates in the relay link, in the RLS response message, and may transmit the RLS response message to the source device 110 in operation 724.

Figure 8:
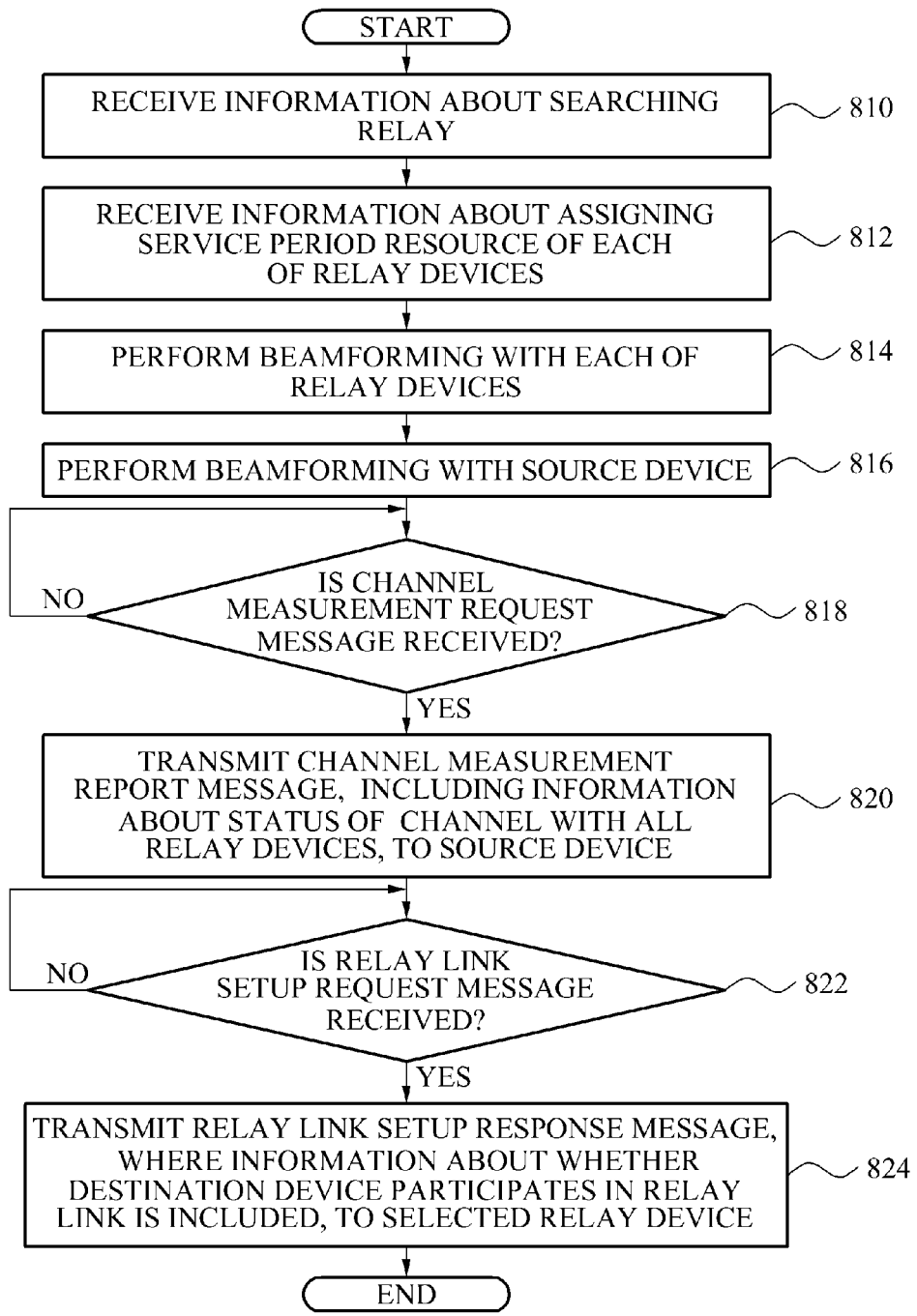
FIG. 8 is a flowchart illustrating an operation of setting a relay link in a destination device of a wireless local area network system according to an embodiment of the present invention.

FIG. 8 is a flowchart illustrating an operation of setting a relay link in a destination device of a wireless local area network system according to an embodiment of the present invention.

Referring to FIG. 8, in operation 810, the destination device 140 may receive an unsolicited relay search response message, including information about a relay capability of the source device 110 and a list of relay devices, from the PCP/AP 120.

In operation 812, the destination device 140 may receive information, about assigning a service period resource of each of the relay devices 130, 131, and 132, from the PCP/AP 120.

In operation 814, the destination device 140 may perform a beamforming process with each of the relay devices 130, 131, and 132. In operation 816, the destination device 140 may perform a beamforming process with the source device 110.

In response to a reception of a channel measurement report message from the source device 110 in operation 818, the destination device 140 may transmit a channel measurement report message, including information about a status of a channel to the relay devices 130, 131, and 132, to the source device 110 in operation 820.

In response to a reception of an RLS response message from a relay device 130 selected as the relay link by the source device 110 in operation 822, the destination device 140 may transmit a RLS response message, including information about whether the destination device 140 is participating in the relay link, to the selected relay device 130 in operation 824.

Figure 9:
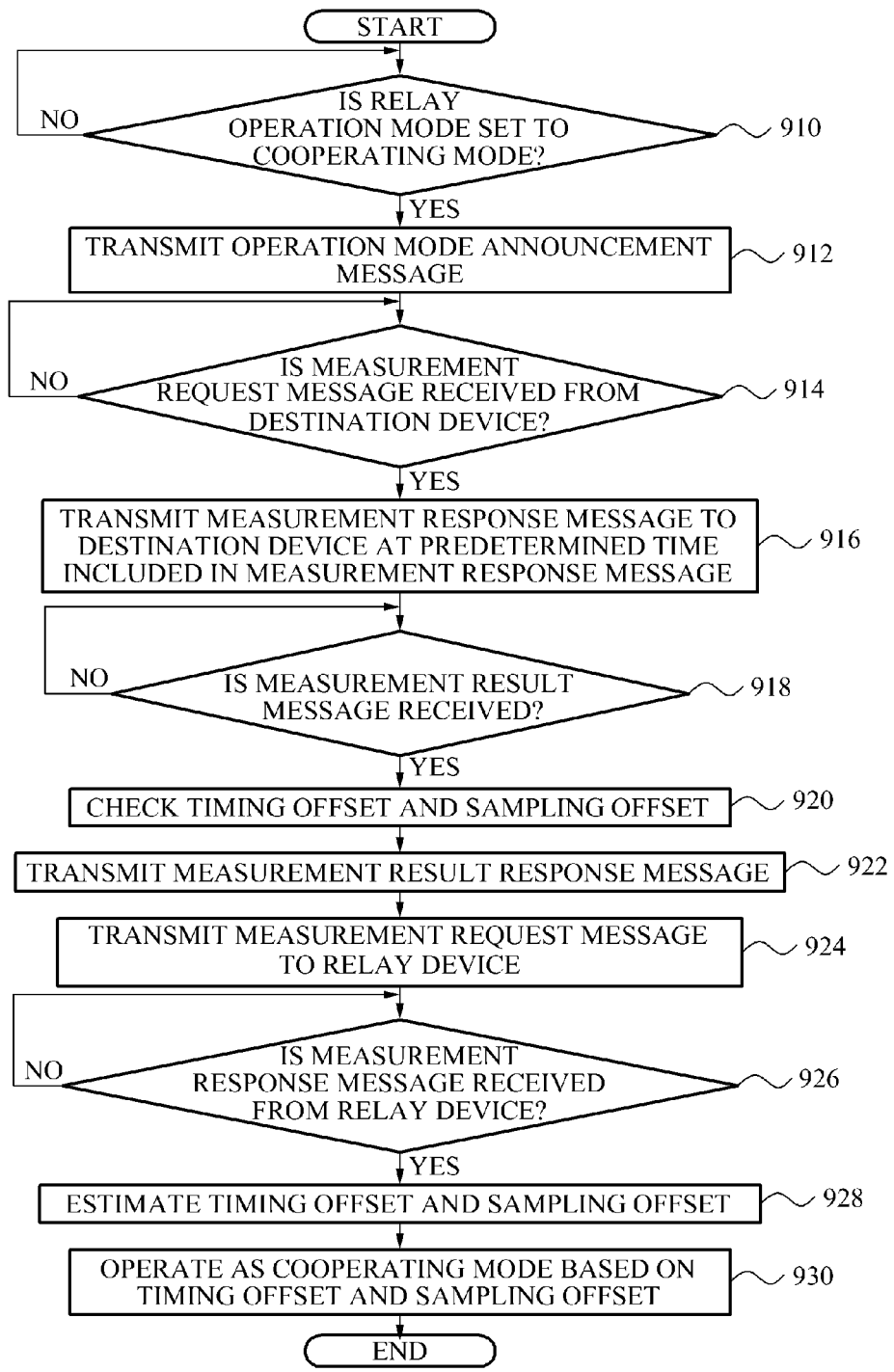
FIG. 9 is a flowchart illustrating an operation of setting a transmission time point when an operation mode of a relay corresponds to a cooperating mode in a source device of a wireless local area network system according to an embodiment of the present invention.

FIG. 9 is a flowchart illustrating an operation of setting a transmission time point when an operation mode of a relay corresponds to a cooperating mode in a source device of a wireless local area network system according to an embodiment of the present invention.

Referring to FIG. 9, when an operation mode of a relay is determined to be a cooperating mode in operation 910, the source device 110 may transmit an operation mode announcement message, announcing that an operation mode corresponds to a cooperating mode, to the selected relay device 130 and the destination device 140 in operation 912.

Subsequently, in response to a reception of a first measurement request message from the destination device 140 in operation 914, the source device 110 may transmit a first measurement response message at a predetermined time in operation 916.

In response to a reception of a measurement result message from the destination device 140 in operation 918, the source device 110 may check a sampling offset and a timing offset between devices included in the measurement result message in operation 920. The sampling offset and the timing offset between devices included in the measurement result message may correspond to a sampling offset and a timing offset between the source device 110 and the destination device 140 or a sampling offset and a timing offset between the destination device 140 and the relay device 130 selected by the destination device 140.

In operation 922, the source device 110 may transmit a measurement result response message, announcing that the measurement result message is received, to the destination device 140.

In operation 924, the source device 110 may transmit a measurement request message to the selected relay device 130. In response to a reception of the measurement response message from the selected relay device 130 in operation 926, the source device 110 may estimate a sampling offset and a timing offset between the source device 110 and the selected relay device 130 in operation 928.

In operation 930, the source device 110 may adjust a transmission time point, at which a frame is transmitted, to enable the same frame to simultaneously arrive at the destination device 140 using timing offsets and sampling offsets between each device.

Figure 10:
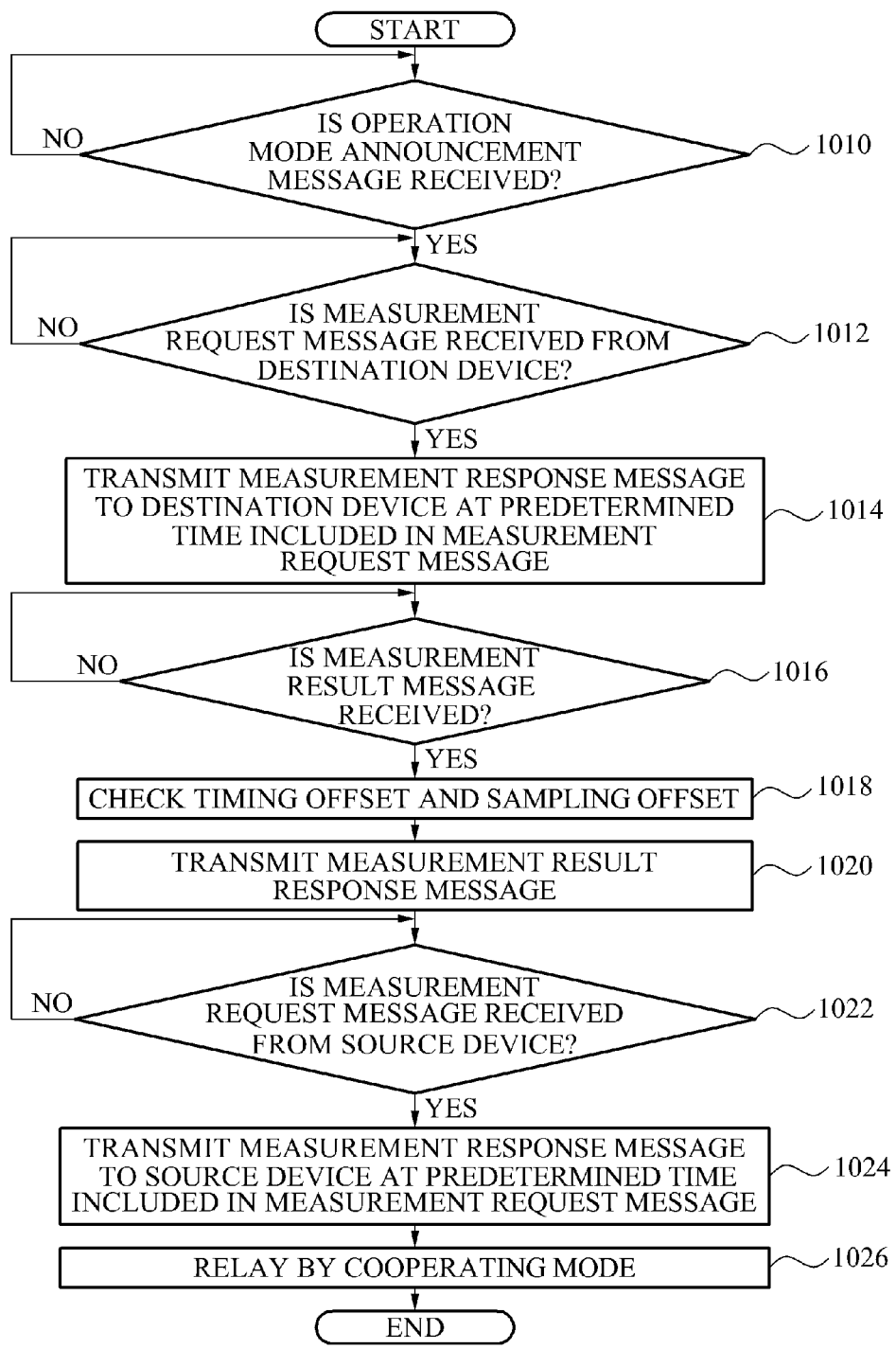
FIG. 10 is a flowchart illustrating an operation of setting a transmission time point when an operation mode of a relay corresponds to a cooperating mode in a relay device of a wireless local area network system according to an embodiment of the present invention.

FIG. 10 is a flowchart illustrating an operation of setting a transmission time point when an operation mode of a relay corresponds to a cooperating mode in the relay device 130 of a wireless local area network system according to an embodiment of the present invention.

Referring to FIG. 10, in operation 110, in response to a reception of an operation mode announcement message, announcing an operation mode corresponds to a cooperating mode, from the source device 110, the relay device 130 may initiate a procedure for operating in the cooperating mode described as below.

Thereafter, in response to a reception of a measurement request message from the destination device 140, in operation 1012, the relay device 130 may transmit a measurement response message to the destination device 140 at a predetermined time included in the measurement request message in operation 1014.

In response to a reception of a measurement result message from the destination device 140 in operation 1016, the relay device 130 may check information about a sampling offset and a timing offset between the destination device 140 and the relay device 130, or difference between sampling offsets and timing offsets, between the destination device and the relay device and between the destination device and the source device in operation 1018.

In operation 1020, the relay device 130 may transmit a measurement result response message, to the destination device 140, announcing the measurement result message is received.

In response to a reception of a measurement request message from the source device 110 in operation 1022, the relay device 130 may transmit a measurement response message to the source device 110 at a predetermined time included in the measurement request message in operation 1024.

Thereafter, the relay device 130 may operate in a cooperating mode to relay a data frame, received from the source device 110, to the destination device 140.

Figure 11:
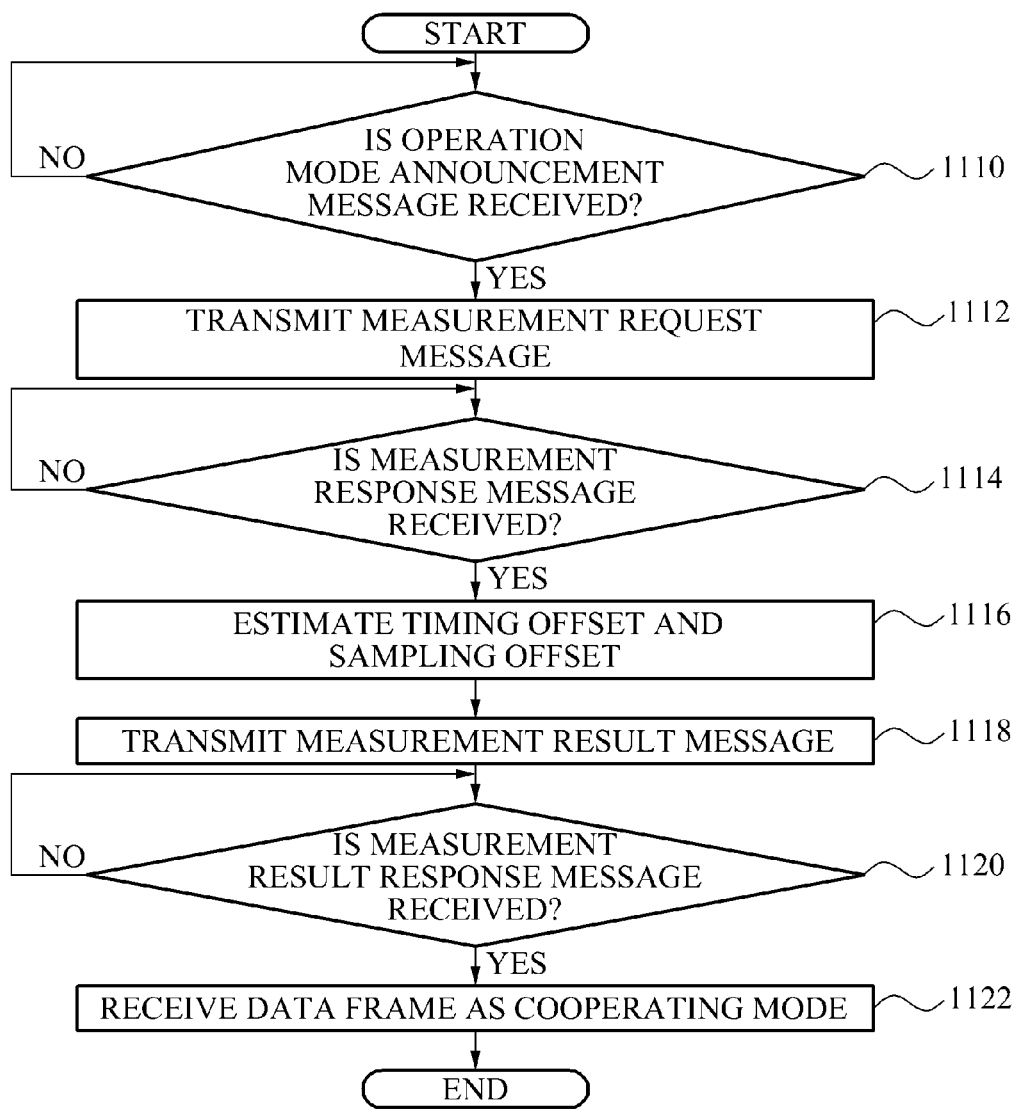
FIG. 11 is a flowchart illustrating an operation of setting a transmission time point when an operation mode of a relay corresponds to a cooperating mode in a source device of a wireless local area network system according to an embodiment of the present invention.

FIG. 11 is a flowchart illustrating an operation of setting a transmission time point when an operation mode of a relay corresponds to a cooperating mode in the source device 110 of a wireless local area network system according to an embodiment of the present invention.

Referring to FIG. 11, in response to a reception of an operation mode announcement message, indicating that an operation mode of a relay corresponds to a cooperating mode, from the source device 110 in operation 1110, the destination device 140 may transmit a measurement request message to the selected relay device 130 and the source device 110 in operation 1112.

In response to a reception of a measurement response message from each of the source device 110 and the selected relay device 130 in operation 1114, the destination device 140 may estimate a sampling offset and a timing offset between the source device 110 and the destination device 140, or estimate a sampling offset and a timing offset between the selected relay device 130 and the destination device 140 using received measurement response messages in operation 1116.

In operation 1118, the destination device 140 may transmit a measurement result message, including measured sampling offset and timing offset between devices, to the selected relay device 130 and the source device 110.

In response to a reception of a measurement result response message, announcing that the measurement result message is received, from the selected relay device 130 and the source device 110 in operation 1120, the destination device 140 may receive a data frame as a cooperating mode in operation 1122.

Hereinafter, a configuration, of each device in a wireless local area network system for setting a relay link by the above procedure, will be described with reference to FIG. 12 through FIG. 14.

Figure 12:
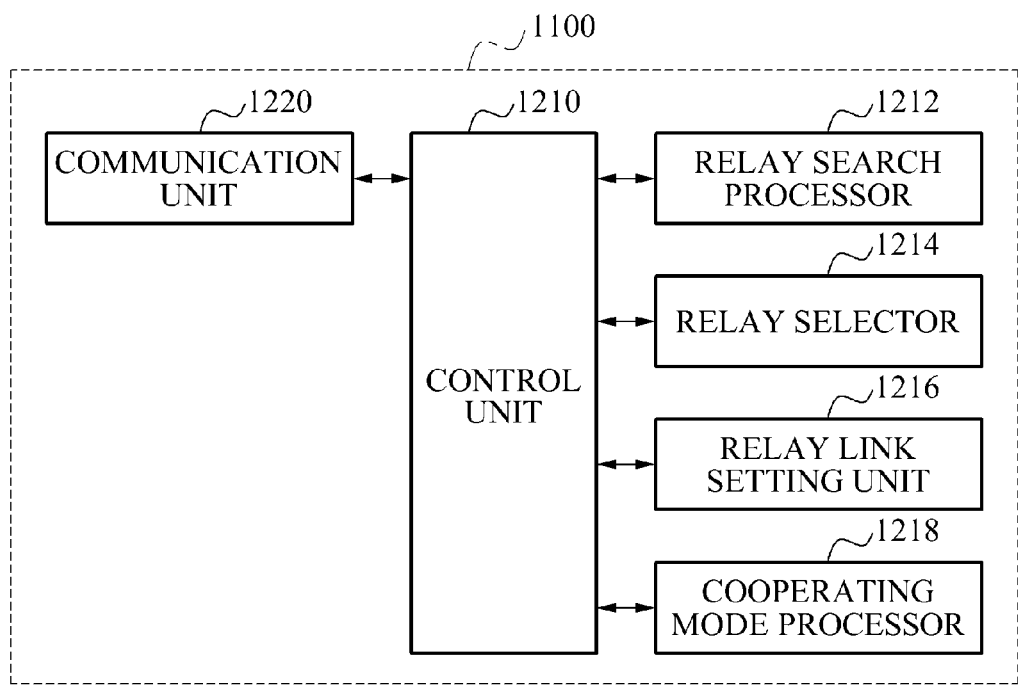
FIG. 12 is a diagram illustrating a configuration of a source device for transmitting data using a relay in a wireless local area network system according to an embodiment of the present invention.

FIG. 12 is a diagram illustrating a configuration of the source device 110 for transmitting data using a relay in a wireless local area network system according to an embodiment of the present invention.

Referring to FIG. 12, the source device 110 may include a control unit 1210, a communication unit 1220, a relay search processor 1212, a relay selector 1214, a relay to link setting unit 1216, and a cooperating mode processor 1218.

The communication unit 1220 may correspond to a device for transmitting and receiving data through a local area communication, and may provide a local area communication among the PCP/AP 120, relay devices, and the destination device 140.

The relay search processor 1212 may search relay devices capable of providing a service through the PCP/AP 120.

The relay selector 1214 may check a status of a channel between the source device 110 and the relay devices, a status of a channel between the source device 110 and the destination device 140, and a status of a channel between the relay devices and the destination device 140. The relay selector 1214 may select a relay device, to be used, using information about a relay capability of each of the relay devices 130, 131, and 132, and information about a status of a channel between devices.

The relay link setting unit 1216 may request and receive a response from a selected relay device 130 and the destination device 140 for information about whether a relay link through the selected relay device 130 is permitted, and then set the relay link.

When an operation mode of a relay is determined to be a cooperating mode, the cooperating mode processor 1218 may adjust a transmission time point, at which a frame is transmitted, to enable the same frame to simultaneously reach the destination device. Above descriptions with reference to FIG. 9 may be referred to for a further procedure of adjusting the transmission time point.

The control unit 1210 may control an overall operation of the source device 110. The control unit 1210 may perform a function of the relay search processor 1212, the relay selector 1214, the relay link setting unit 1216, and the cooperating mode processor 1218. The control unit 1210, the relay search processor 1212, the relay selector 1214, the relay link setting unit 1216, and the cooperating mode processor 1218 are separately illustrated to describe each function individually. Thus, the control unit 1210 may include at least one processor configured to perform each function of the relay search processor 1212, the relay selector 1214, the relay link setting unit 1216, and the cooperating mode processor 1218. The control unit 1210 may include at least one processor configured to perform a portion of each function of the relay search processor 1212, the relay selector 1214, the relay link setting unit 1216, and the cooperating mode processor 1218.

Figure 13:
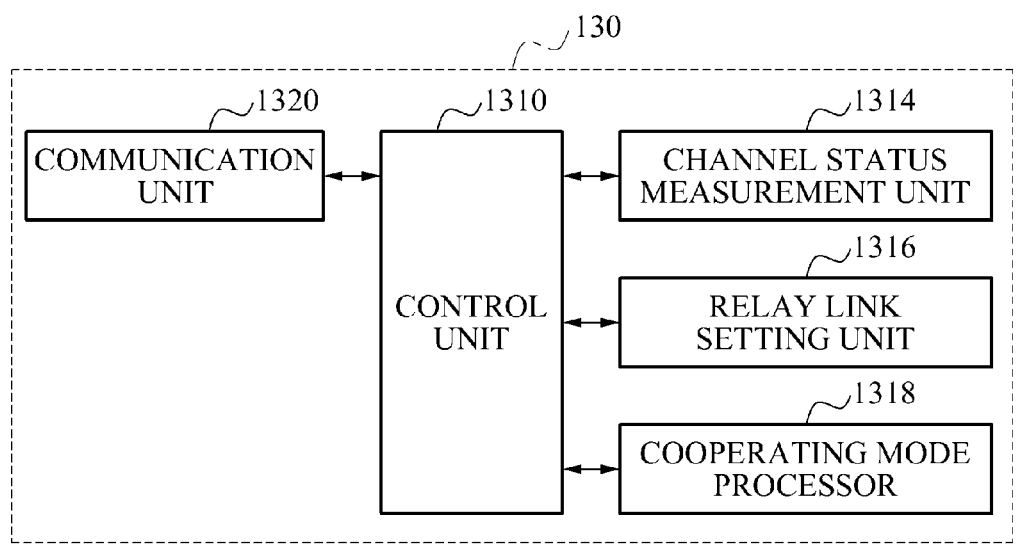
FIG. 13 is a diagram illustrating a configuration of a relay device for relaying data between a source device and a destination device in a wireless local area network system according to an embodiment of the present invention.

FIG. 13 is a diagram illustrating a configuration of the relay device 130 for relaying data between the source device 110 and the destination device 140 in a wireless local area network system according to an embodiment of the present invention.

Referring to FIG. 13, the relay device 130 may include a control unit 1310, a communication unit 1320, a channel status measurement unit 1314, a relay link setting unit 1316, and a cooperating mode processor 1318.

The communication unit 1320 may correspond to a device for transmitting and receiving data through a local area communication, and may provide a local area communication among the source device 110, the PCP/AP 120, and the destination device 140.

The channel status measurement unit 1314 may perform a beamforming process with each of the source device 110 and the destination device 140, and may transmit a channel measurement report message, including information about a status of a channel to the source device 110, to the source device 110 in response to a reception of a channel measurement request message from the source device 110.

In response to a reception of an RLS request message from the source device 110, the relay link setting unit 1316 may transmit the RLS request message to the destination device 140. In response to a reception of an RLS response message from the destination device 140, the relay link setting unit 1316 may include information about whether the relay device 130 participates in a relay link in the RLS response message and may transmit the RLS response message to the source device 110.

When an operation mode of a relay is determined to be a cooperating mode, the cooperating mode processor 1318 may perform a procedure for adjusting a transmission time point, at which a frame is transmitted, to enable the same frame to reach the destination device. The foregoing descriptions with reference to FIG. 10 may be referred to for a further procedure of adjusting the transmission time point. The control unit 1310 may control an overall operation of the relay device 130.

The control unit 1310 may perform a function of the channel status measurement unit 1314, the relay link setting unit 1316, and the cooperating mode processor 1318. The control unit 1310, the channel status measurement unit 1314, the relay link setting unit 1316, and the cooperating mode processor 1318 are separately illustrated to describe to each function separately. Thus, the control unit 1310 may include at least one processor configured to perform each function of the channel status measurement unit 1314, the relay link setting unit 1316, and the cooperating mode processor 1318. The control unit 1310 may include at least one processor configured to perform a portion of each function of the channel status measurement unit 1314, the relay link setting unit 1316, and the cooperating mode processor 1318.

Figure 14:
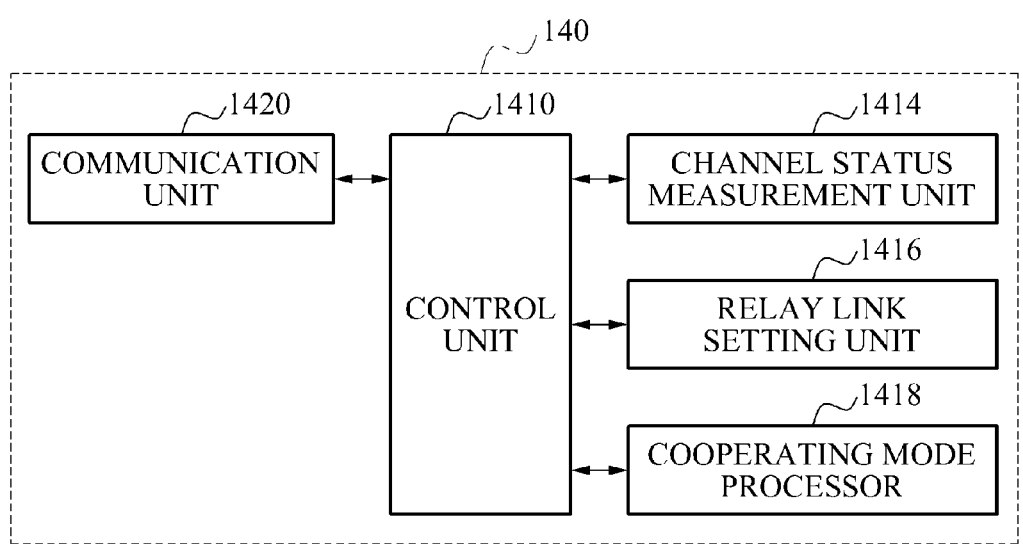
FIG. 14 is a diagram illustrating a configuration of a destination device for receiving data using a relay in a wireless local area network system according to an embodiment of the present invention.

FIG. 14 is a diagram illustrating a configuration of the destination device 140 for receiving data using a relay in a wireless local area network system according to an embodiment of the present invention.

Referring to FIG. 14, the destination device 140 may include a control unit 1410, a communication unit 1420, a channel status measurement unit 1414, a relay link setting unit 1416, and a cooperating mode processor 1418.

The communication unit 1420 may correspond to a device for transmitting and receiving data through local area communication, and may provide local area communication among the source device 110, the PCP/AP 120, and the relay device 130.

The channel status measurement unit 1414 may perform a beamforming process with the source device 110 and each of the relay devices 130, 131, and 132. In response to a reception of a channel measurement request message from the source device 110, the channel status measurement unit 1414 may transmit, a channel measurement report message, including information about a status of a channel to the relay devices 130, 131, and 132, to the source device 110.

In response to a reception of an RLS request message from the relay device 130 selected as a relay link by the source device 110, the relay link setting unit 1416 may transmit, to a selected relay device 130, an RLS response message including information about whether the destination device 140 participates in the relay link.

When an operation mode of a relay is determined to be a cooperating mode, the cooperating mode processor 1418 may perform a procedure for adjusting a transmission time point, at which a frame is transmitted at the source device 110, to enable the same frame, received through the source device 110 and the relay device 130, to simultaneously reach the destination device. The foregoing descriptions with reference to FIG. 11 may be referred to for a procedure of further adjusting the transmission time point.

The control unit 1410 may control an overall operation of the destination device 140. The control unit 1410 may perform a function of the channel status measurement unit 1414, the relay link setting unit 1416, and the cooperating mode processor 1418. The control unit 1410, the channel status measurement unit 1414, the relay link setting unit 1416, and the cooperating mode processor 1418 are separately illustrated to describe each function separately. Thus, the control unit 1410 may include at least one processor configured to perform each function of the channel status measurement unit 1414, the relay link setting unit 1416, and the cooperating mode processor 1418. The control unit 1410 may include at least one processor configured to perform a portion of each function of the channel status measurement unit 1414, the relay link setting unit 1416, and the cooperating mode processor 1418.

Several action frame formats may be defined to support a relaying function according to an embodiment of the present invention. An "action field value" for classifying an action of the action frame formats may be defined as in Table 1 as follows.

TABLE 1

<Relay Action Field Values>

| Action field value | Meaning |
| --- | --- |
| 0 | Relay search request |
| 1 | Relay search response |
| 2 | RLS request |
| 3 | RLS response |
| 4 | RLS announcement |
| 5 | TPA request |
| 6 | TPA response |
| 7-255 | Reserved |

In Table 1 above, the "RLS request" may be configured as in Table 2 as follows.

TABLE 2

| Order | Information |
| --- | --- |
| 1 | Category |
| 2 | Action |
| 3 | Destination MAC Address |
| 4 | Relay MAC Address |
| 5 | Source MAC Address |
| 6 | Capability Information |
| 7 | RLS Timeout Value |
| 8 | Supported rates |
| 9 | Extended Supported rates |
| 10 | Duplex Mode |
| 11 | Transmission Mode |
| 12 | Link Change Interval |
| 13 | R-D Link Interval |

In Table 1 above, the "RLS response" may be configured as follows in Table 3.

TABLE 3

| Order | Information |
| --- | --- |
| 1 | Category |
| 2 | Action |
| 3 | Status Code |
| 4 | Destination MAC Address |
| 5 | Relay MAC Address |
| 6 | Source MAC Address |
| 7 | Capability Information |
| 8 | Supported rates |
| 9 | Extended Supported rates |

In Table 1 above, the "TPA request" may be configured as follows in Table 4.

TABLE 4

| Order | Information |
| --- | --- |
| 1 | Category |
| 2 | Action |
| 3 | Dialog Token |
| 4 | Timing Offset |
| 5 | Sampling Frequency Offset |

In Table 1 above, the "TPA response" may be configured as follows in Table 5.

TABLE 5

| Order | Information |
| --- | --- |
| 1 | Category |
| 2 | Action |
| 3 | Dialog Token |

The processes, functions, methods and/or software described above including a method for wideband short-range wireless communication may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts.

Although a few embodiments of the present invention have been shown and described, the present invention is not limited to the described embodiments. Instead, to it would be appreciated by those skilled in the art that changes may be made to these embodiments without departing from the principles and spirit of the invention, the scope of which is defined by the claims and their equivalents.

The invention claimed is:

1. A method for wideband short-range wireless communication, the method comprising:
discovering, by a source device, a list of relay devices in a basic service set;
checking a status of a channel between the source device and the relay devices and a status of a channel between a destination device and the relay devices, and selecting a relay device to operate as a relay between the source device and the destination device; and
transmitting a link setup request message to the selected relay device, and to setting a relay link through the selected relay device.

2. The method of claim 1, wherein the discovering comprises:
transmitting, from the source device, a relay search request message requesting a personal basic service set central point (PCP) or an access point (AP) to search a relay; and
receiving, from the PCP or the AP, a relay search response message including a list of the relay devices capable of providing a service, and relay capability information.

3. The method of claim 2, wherein the information about a relay capability includes at least one of whether the relay is used, whether an operation to the relay is performed, a permission of using the relay, whether a power is on, a motion, a degree of preference of the relay, information about a duplex at the relay, a type of operation of the relay.

4. The method of claim 1, wherein the selecting comprises:
performing a beamforming process between each of the relay devices and the source device;
transmitting a channel measurement request message from the source device to each of the relay devices, receiving a channel measurement response message including information about measuring a channel between each of the relay devices and the source device, and checking the status of a channel between the source device and the relay devices through the channel measurement response message received from each of the relay devices;
performing a beamforming process between the source device and the destination device; and
transmitting a channel measurement request message from the source device to the destination device, receiving, from the destination device, a channel measurement response message including information about measuring a channel between each of the relay devices and the destination device, and checking the status of a channel between each of the relay devices and the destination device through the channel measurement response message received from the destination device.

5. The method of claim 1, wherein the setting comprises:
transmitting a relay link setup (RLS) request message from the source device to the selected relay device;
receiving an RLS response message from the selected relay device; and
transmitting, to a PCP or an AP, an RLS announcement message announcing that the relay link using the selected relay device is set when both of the selected relay device and the destination device are confirmed to participate in the relay link through the RLS response message, wherein the RLS response message received from the selected relay device includes whether the destination device is participating in the relay link and whether the selected relay device is participating in the relay link.

6. The method of claim 5, the RLS request message includes at least one of information about a relay capability of each of the source device, the destination device, and the selected relay device and information about a relay transmission parameter.

7. The method of claim 6, wherein the information about a relay transmission parameter includes at least one of information about a type of operation of the relay, information about a duplex transmission mode of the relay, and information used for transmitting and receiving other data frames.

8. The method of claim 1, further comprising:
adjusting a transmission time point at which a frame is transmitted to enable a frame, transmitted from the source device to the destination device, and a frame, transmitted from the relay device to the destination device, to simultaneously arrive at the destination device,
wherein a relay operation mode of the selected relay device is determined to be a cooperating mode.

9. The method of claim 8, wherein the relay operation mode is determined to by determining a more efficient operation mode between a switching mode and the cooperating mode or by a selection by a user.

10. The method of claim 2, wherein the PCP or the AP transmits the relay search response message to the source device, and then transmits, to the destination device, an unsolicited relay search response message including the list of the relay devices and the information about the relay capability of the source device.

11. A method for a wideband short-range wireless communication, the method comprising:
acquiring information about a relay capability of a destination device;
discovering relay devices capable of providing a service through a personal basic service set central point (PCP) or an access point (AP);
receiving information, about assigning a service period resource of each of the relay devices, from the PCP or the AP;
performing a beamforming process with each of the relay devices;
acquiring, from each of the relay devices, a status of a channel between the source device and each of the relay devices;
performing a beamforming process with the destination device;
acquiring, from a destination device, a status of a channel between the source device and the destination device and a status of a channel between the relay devices and the destination devices;
selecting a relay device to be used using the status of a channel between the source device and the relay devices, the status of a channel between the source device and the destination device, the status of a channel between the relay devices and the destination devices, and information about a relay capability of each of the relay devices;
requesting and receiving a response from the selected relay device and the destination device for whether a relay link is permitted through the selected relay device; and
transmitting, to the PCP or the AP, a relay link setup (RLS) announcement message announcing that the relay link is set when the relay link is successfully set.

12. The method of claim 11, further comprising:
transmitting an operation mode announcement message, announcing that an operation mode corresponds to a cooperating mode, to the selected relay device and the destination device when an operation mode of a relay is determined to be the cooperating mode at the source device;
transmitting a first measurement response message at a predetermined time in response to a reception of a first measurement request message from the destination device;
checking a first sampling offset and a first timing offset between the source device and the destination device included in a measurement result message, and checking a second sampling offset and a second timing offset between the selected relay device and the destination device at the destination device in response to a reception of the measurement result message from the destination device;
transmitting a measurement result response message, announcing the reception of the measurement result message, to the destination device;
transmitting a second measurement request message to the selected relay device, receiving a second measurement response message from the selected relay device, and estimating a third sampling offset and a third timing offset between the source device and the selected relay device; and
adjusting a transmission time point at which a frame is transmitted to enable the same frame to be simultaneously reach the destination device using the first timing offset, the first sampling offset, the second timing offset, the second sampling offset, the third timing offset, and the third sampling offset.

13. A method for wideband short-range wireless communication, the method comprising:
receiving information about assigning a service period resource from a personal basic service set central point (PCP) or an access point (AP);
performing a beamforming process with each of a source device and a destination device;
transmitting a channel measurement report message, including information about a status of a channel to the source device, to the source device in response to a reception of a channel measurement request message from the source device;
transmitting a relay link setup (RLS) request message to the destination device in response to a reception of the RLS request message from the source device; and
including information, about whether a relay link is permitted, in an RLS response message, and transmitting the RLS response message to the source device, in response to a reception of the RLS response message from the destination device.

14. The method of claim 13, comprising:
transmitting a measurement response message to the destination device at a predetermined time included in a first measurement request message when the first measurement request message is received from the destination device and an operation mode of the relay device corresponds to a cooperating mode; and
transmitting a second measurement response message to the source device at a predetermined time included in a second measurement request message in response to a reception of the second measurement request message from the source device.

15. A method for wideband short-range wireless communication, the method comprising:
- receiving an unsolicited relay search response message, including a list of relay devices and information about a relay capability of a source device, from a personal basic service set central point (PCP) or an access point (AP);
- receiving information, about assigning a service period resource of each of the relay devices, from the PCP or the AP;
- performing a beamforming process with each of the relay devices;
- performing a beamforming process with the source device;
- transmitting a channel measurement report message, including information about a status of a channel to the relay devices, to the source device in response to a reception of a channel measurement request message from the source device; and
- transmitting a relay link setup (RLS) response message, including information about whether the destination device is participating in a relay link, to a relay device selected as a relay link by the source device in response to a reception of an RLS request message from the selected relay device.

16. The method of claim 15, further comprising:
- adjusting a transmission time point at which a frame is transmitted to enable a frame, transmitted from the source device to the destination device, and a frame, transmitted from the selected relay device to the destination device, to simultaneously reach the destination device,
- wherein a relay operation mode of the selected relay device is determined to be a cooperating mode.

17. The method of claim 16, wherein the adjusting comprises:
- transmitting a measurement request message to the selected relay device and the source device in response to a reception of an operation mode announcement message, announcing that an operation mode of a relay corresponds to a cooperating mode, from the source device;
- estimating a first sampling offset and a first timing offset between the source device and the destination device using a measurement response message received from the source device;
- estimating a second sampling offset and a second timing offset between the selected relay device and the destination device using a measurement response message received from the selected relay device;
- transmitting, to the selected relay device and the source device, a measurement result message including the first timing offset, the first sampling offset, the second timing offset, and the second sampling offset; and
- receiving a data frame as the cooperating mode in response to a reception of a measurement result response message, announcing that the measurement result message is received, from the selected relay device and the source device.

18. The method of claim 17, wherein the measurement request message corresponds to a transmission time point adjustment (TPA) request message where both of a timing offset and a sampling offset are set to "0."

19. The method of claim 16, wherein:
- the destination device repeats an operation of adjusting the transmission time point for a predetermined number of times, and
- transmitting, to the source device, a report frame indicating whether a procedure of adjusting the transmission time point is successful after repeating the operation of adjusting the transmission time point for a predetermined number of times.

20. The method of claim 19, wherein the destination device
- transmits a TPA request frame to the selected relay device, and receives a TPA response frame, corresponding to a response frame with respect to the TPA request frame, from the selected relay device,
- estimates a time deviation between a predetermined delay time and an actual arrival time of the TPA response frame in response to a reception of the TPA response frame, and
- determines the procedure of adjusting the transmission time point is successful when the time deviation corresponds to "$2 \times dT_{DR} + (dT_{DS} - dT_{DR})$,"
- wherein $dT_{DR}$ denotes a propagation delay from the destination device to the selected relay device, $dT_{DS}$ denotes a propagation delay from the destination device to the source device, and $dT_{DS} - dT_{DR}$ denotes a timing offset set in the TPA request frame.

* * * * *